(12) United States Patent
Ward

(10) Patent No.: US 7,088,227 B2
(45) Date of Patent: Aug. 8, 2006

(54) ALARM FOR A HYDRAULIC SYSTEM, HYDRAULIC SYSTEM, METHOD OF GIVING AN ALARM AND VEHICLE INCORPORATING A HYDRAULIC SYSTEM

(75) Inventor: Gordon Ward, Romford Essex (GB)

(73) Assignee: General Signal UK Limited (GB)

( * ) Notice: Subject to any disclaimer, the term of this patent is extended or adjusted under 35 U.S.C. 154(b) by 152 days.

(21) Appl. No.: 10/745,647

(22) Filed: Dec. 29, 2003

(65) Prior Publication Data

US 2005/0146437 A1 Jul. 7, 2005

(51) Int. Cl.
*B60Q 1/00* (2006.01)
*G08B 21/00* (2006.01)
*B60T 13/74* (2006.01)

(52) U.S. Cl. .................. 340/451; 340/452; 340/611; 340/614; 340/626; 303/3

(58) Field of Classification Search ............... 340/451
See application file for complete search history.

(56) References Cited

U.S. PATENT DOCUMENTS

| 4,417,236 A | 11/1983 | Hung et al. .............. 340/626 |
| 4,529,975 A | 7/1985 | Hung et al. .............. 340/626 |
| 4,663,608 A * | 5/1987 | Kelly ..................... 340/449 |
| 4,701,742 A * | 10/1987 | Ruehr ................... 200/61.25 |
| 5,139,044 A * | 8/1992 | Otten et al. ................ 137/80 |
| 5,542,287 A * | 8/1996 | Powers ................... 73/40.5 R |
| 5,864,287 A * | 1/1999 | Evans et al. .............. 340/506 |
| 6,175,302 B1* | 1/2001 | Huang ..................... 340/442 |
| 6,825,770 B1* | 11/2004 | Miller et al. .............. 340/626 |

FOREIGN PATENT DOCUMENTS

| EP | 0050319 A2 | 4/1982 |
| EP | 0928849 A2 | 7/1999 |
| GB | 2100039 A | 12/1982 |
| GB | 2100900 A | 6/1983 |

OTHER PUBLICATIONS

Search Report under Section 17, Mar. 31, 2004.

* cited by examiner

*Primary Examiner*—Donnie L. Crosland
(74) *Attorney, Agent, or Firm*—Baker & Hostetler LLP

(57) ABSTRACT

An alarm for a hydraulic system, a hydraulic system incorporating an alarm, a vehicle having a hydraulic system which incorporates an alarm, and a method of giving an alarm in a hydraulic system, where the hydraulic system comprises hydraulic fluid which is put in contact with a pressure detector, the pressure detector being for giving a signal in response to a condition of the hydraulic fluid in the hydraulic system. An alarm generator integral with said pressure detector is provided for giving an audible alarm in response to a said signal.

11 Claims, 2 Drawing Sheets

ALARM FOR A HYDRAULIC SYSTEM, HYDRAULIC SYSTEM, METHOD OF GIVING AN ALARM AND VEHICLE INCORPORATING A HYDRAULIC SYSTEM

FIELD OF THE INVENTION

The present invention relates to an alarm for a hydraulic system, a hydraulic system incorporating an alarm, a vehicle having a hydraulic system which incorporates an alarm, and a method of giving an alarm in a hydraulic system. More particularly, the present invention is concerned with giving an alarm dependent upon the condition of the hydraulic system.

BACKGROUND OF THE INVENTION

Hydraulic systems are a very widely used source of motive power for various operations. Hydraulic systems are particularly widely used in vehicles, for example goods vehicles, for operating a number of components of the vehicle. For example, hydraulic systems may be used in tipper trucks for tipping the load carrying part for discharging the load.

Such hydraulic systems typically comprise a pump for pressurising a hydraulic fluid, a valve means for controlling the distribution of pressurised hydraulic fluid and a device which can be operated by the pressurised hydraulic fluid, for example a motor or a piston in a cylinder. These components and the associated pipe work for distributing the pressurised hydraulic fluid are generally referred to as the hydraulic circuit or hydraulic system.

It is desirable to know the condition of the hydraulic fluid in the hydraulic circuit. In particular, it is important to know if the hydraulic fluid is in a pressurised or non-pressurised condition.

For example, an operator may need to know if the means which are driven by hydraulic fluid are actuated. A person maintaining the system may need to know if there is pressurised fluid present in any part of the circuit.

It is particularly important in goods vehicles which have components such as movable bodies to be aware of the condition of the movable bodies. As the movable bodies are typically operated by a hydraulic system, the condition of the movable body can be monitored by checking the hydraulic system.

It is known to provide an alarm for a hydraulic system on a vehicle, comprising a pressure switch which is in communication with the hydraulic system so that pressurised hydraulic fluid can act on the pressure switch to give a signal. An alarm is provided for example in the cap of the vehicle, to give an audible or visual indication of the state of the hydraulic system. In these systems, the pressure switch is located in one part of the vehicle and the alarm generator is located in another part of the vehicle. This is a widely used system, as it places an alarm generator at a position where the driver, who will typically be the operator of the hydraulic system, will be when driving the vehicle. However, this type of alarm is time consuming to install.

Accordingly, it is an object of the present invention to provide an alarm for giving an audible alarm which is dependent on the condition of the hydraulic fluid and which is simple to manufacture and install.

The present inventor has realised that an alarm for indicating the condition of a hydraulic system can be provided in which the alarm generator is integral with the pressure detector. In practice, it is found that the alarm can be made loud enough to be audible to the driver even when the driver is in the cab and the alarm generator is located on a different part of the vehicle. It has been found that this arrangement can simplify the manufacture, installation and maintenance of the alarm, as connections between the pressure detector and the alarm generator can be made very short.

SUMMARY OF THE INVENTION

It is therefore a feature and advantage of the present invention to provide an alarm for a hydraulic system and a method of operating it, which provides a signal dependent on the condition of the hydraulic system and which is compact and simple to manufacture and maintain.

The above and other features and advantages are achieved through the use of a novel system and method as described herein.

In accordance with the present invention there is provided an alarm for a hydraulic system comprising hydraulic fluid, said alarm comprising a connector for connecting to said hydraulic system, a pressure detector, said connector being for putting said pressure detector in contact with said hydraulic fluid, said pressure detector being for giving a signal in response to a condition of said hydraulic fluid in said hydraulic system, and an alarm generator integral with said pressure detector for giving an audible alarm in response to said signal.

The present invention further provides a hydraulic system comprising an alarm, said hydraulic system comprising hydraulic fluid, a pressure detector which is for giving a signal dependent upon the condition of said hydraulic fluid, and an alarm generator integral with said pressure detector for giving an audible alarm in response to said signal.

The present invention further provides a vehicle comprising a movable part, a hydraulic system for operating said movable part, said hydraulic system comprising hydraulic fluid, a pressure detector for giving a signal in response to a condition of said hydraulic fluid, and an alarm generator for giving an audible alarm in response to said signal, said alarm generator being integral with said pressure detector.

The present invention finally provides a method of giving an alarm in a hydraulic system, said hydraulic system comprising hydraulic fluid, said method comprising putting said hydraulic fluid in contact with a pressure detector, giving a signal dependent upon the condition of said hydraulic fluid using said pressure detector, giving said signal to an alarm generator integral with said pressure detector, and giving an audible alarm in response to said signal.

DESCRIPTION OF THE INVENTION

In the present invention, an alarm generator is integral with a pressure detector.

By "integral" it is meant that the pressure detector and the alarm generator are both mounted to a common structure, means for conducting the signal from the pressure detector to the alarm generator being mounted on the common structure or on the pressure detector or alarm generator. In this way, no other wiring is required, simplifying manufacture and installation. Preferably, the common structure encloses the means for conducting the signal from the pressure switch to the alarm generator. Preferably, the common structure substantially encloses the pressure detector and the alarm generator.

The common structure preferably rigidly mounts the pressure detector and alarm generator.

In a particularly preferred embodiment, the common structure in which the pressure detector and the alarm generator are mounted is substantially closed, comprising only the connector for connecting to the hydraulic system, a part for transmitting the audible alarm from the alarm generator, and, optionally, means for connection to an external power supply.

The pressure detector may be of any suitable design. Preferably, it is a pressure switch. Preferably, the pressure switch is of a design commonly used in the construction of motor vehicles, for example in hydraulic systems for operating brakes.

Similarly, the connector may be of any standard design. The connector may be integral with the pressure switch, in a manner which is known in the art of vehicle manufacture for example in hydraulic systems for brakes as described above.

The pressure detector may be configured to give a signal if the pressure of the hydraulic fluid in the hydraulic system increases above a pre-determined level or decreases below a pre-determined level.

It is particularly preferred that the pressure detector be configured to give a signal if the pressure rises above a certain level. Preferably, the pre-determined level is of the order of 3000 Pa preferably above about 4000 Pa (about 0.5 psi).

The alarm generator may be any suitable alarm generator. It is preferably configured to give an alarm if the signal is received from the pressure detector. It is of course possible to arrange the alarm generator so that it gives an alarm if the signal from the pressure detector stops.

The alarm may be of any suitable type for example a buzzer, a tone, an audible message, an intermittent signal or a continuous signal or any combination of these signals.

Preferably, the alarm generator gives a signal having a noise level of at least 95 dB. Preferably the alarm generator is for giving a signal which is audible within a cab of a vehicle on which the alarm is mounted. Preferably, the alarm generator gives a signal which is audible within 3 meters.

The alarm of the present invention may be operable using an internal power supply or using a conventional 12 or 24 volt supply as commonly used on vehicles.

Preferably, the alarm of the present invention is waterproof so that it can be mounted on the exterior of a system or vehicle and continue to operate reliably in all weather conditions.

Optionally, a visible signal such as a light may be provided. Preferably, the visible signal is mounted integrally with the pressure detector and alarm generator. Alternatively, the visible signal may be mounted elsewhere.

The present invention will be further described by way of example only with reference to the accompanying drawings, in which:

DESCRIPTION OF THE PREFERRED EMBODIMENT

Figure 1:
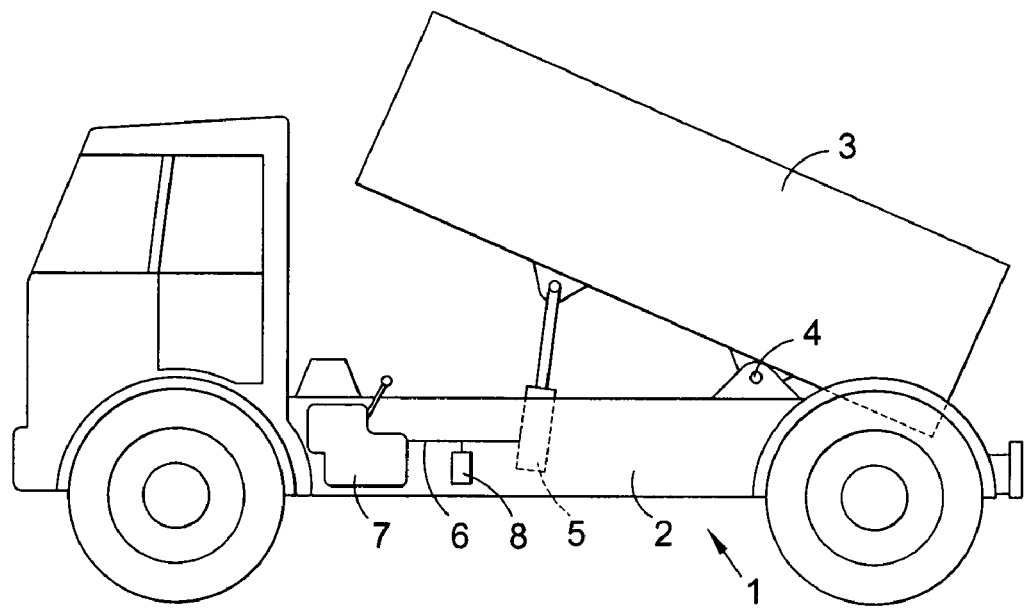
FIG. 1 is a schematic side view of a vehicle comprising a hydraulic system with alarm according to the present invention.
Figure 2:
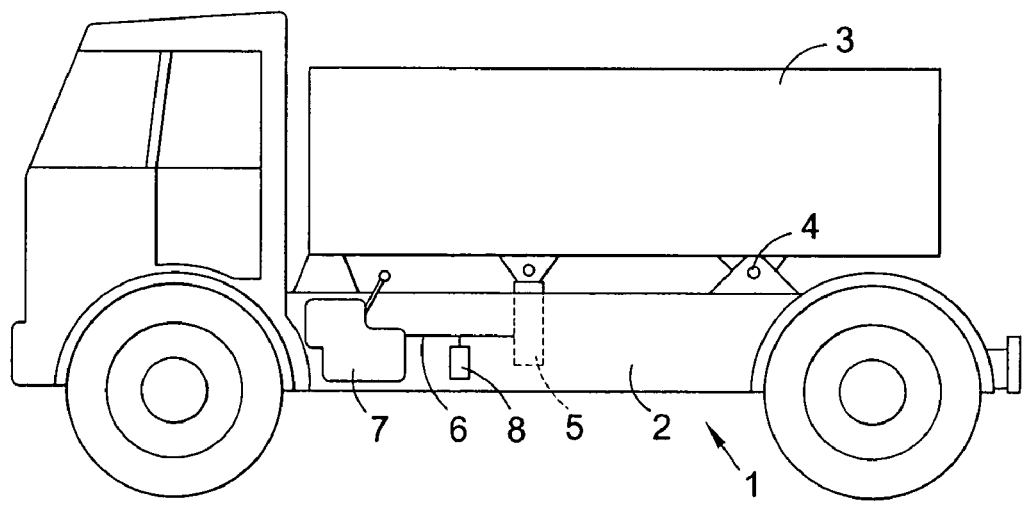
FIG. 2 is a schematic side view of the vehicle of FIG. 1, with the body lowered.

A goods vehicle 1 is shown schematically in FIG. 1. It comprises a chassis 2 and a movable part 3, comprising a tipping body. The tipping body 3 is movable between an initial rest position in which it is horizontal (as shown in FIG. 2) and the position shown in FIG. 1 in which it has been rotated around an axle 4 by a hydraulic piston 5. The hydraulic piston is supplied with pressurised hydraulic fluid along a supply line 6 from a hydraulic power supply 7. The hydraulic power supply includes, in a manner well known to the person skilled in the art, a reservoir for hydraulic fluid, a pump for pressurising the hydraulic fluid and a valve for controlling the supply of hydraulic fluid so that an operator can selectively raise or lower the movable part.

An alarm 8 according to the present invention is provided in communication with the supply line 6.

Figure 3:
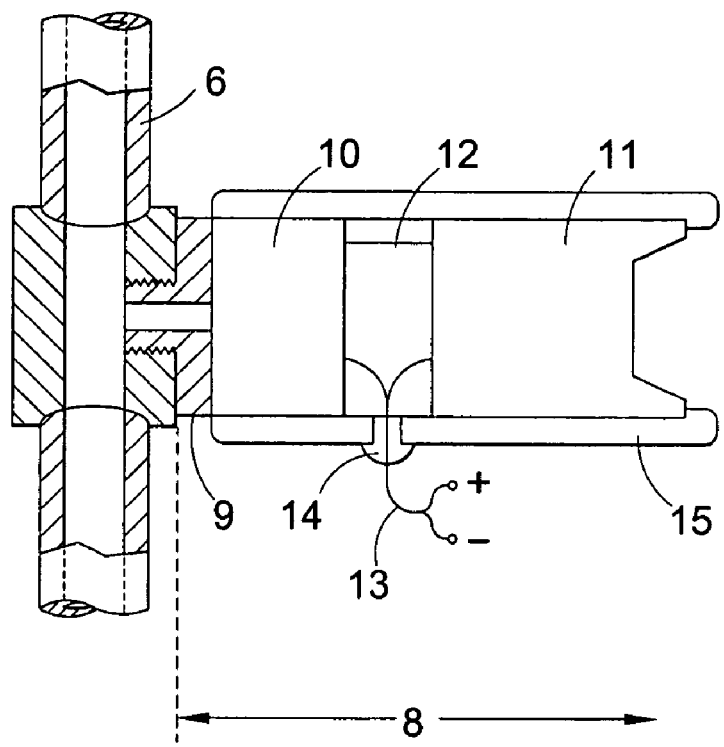
FIG. 3 is a sketch cross sectional view through an alarm according to the present invention.

FIG. 3 shows a sketch cross sectional view through the alarm 8 of the present invention. The alarm 8 is shown engaged with the supply line 6, which does not form part of the alarm. The alarm 8 comprises a connector 9 which is connected to a suitable junction in the supply line 6 so that the hydraulic fluid in the supply line 6 is put into communication with a pressure switch 10.

The pressure switch 10 is of conventional design. It is configured to give a signal if the pressure of the hydraulic fluid in the supply line 6 exceeds a value of 0.5 psi (4000 Pa). An alarm generator 11 is integrally mounted with the pressure switch 10. The signal from the pressure switch 10 is given via an electrical conductor 12 to the alarm generator 11 if the pressure exceeds 4000 Pa in the supply line 6 so that the alarm generator 11 generates an audible alarm of intensity greater than 95 dB.

The connector 9, pressure switch 10, alarm generator 11 and conductor 12 are integrally contained within a single mounting 15. The mounting 15 comprises a relatively stiff thermoplastic material which is heat shrunk into place so that it firmly grips the exterior of the pressure switch 10, connector 9 and alarm generator 11 in a manner which prevents moisture entering the alarm 8.

A supply of electrical power 13 is provided, which is connectable to a conventional 24 volt or 12 volt power system as used for vehicle systems. It enters the mounting 15 through a seal 14, to ensure that moisture does not enter the alarm 8.

In use, in an initial position as shown in FIG. 1, the hydraulic fluid in the supply line 6 is not pressurised. This is the condition where the movable part 3 of the vehicle is in the lowered, rest position. In this condition, electrical power is supplied via the supply 13 to the pressure switch which is open.

Figure 4:
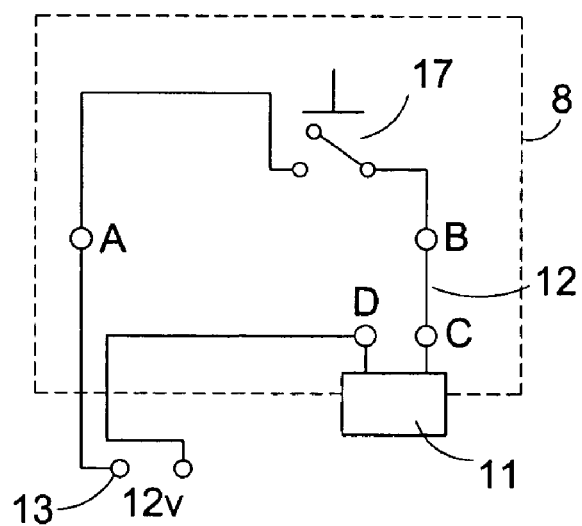
FIG. 4 is a schematic diagram of the circuit incorporated in the alarm of FIG. 3.

FIG. 4 schematically shows an electrical circuit included in the alarm 8. The alarm 8 is schematically shown by the dotted line. The electrical power source 13 is provided for supplying electrical power at 12 volts DC. A first part of the circuit from point A point B is located within the pressure switch 10. The pressure switch is shown schematically at 17. It is shown in the open condition. A part of a circuit B–C corresponds to the length of conductor 12. From points C to D, the circuit is contained within the alarm generator 11.

In the rest position, the electrical circuit is in the open position as shown in FIG. 3, because the pressure switch is not actuated. When the hydraulic system 7 of the vehicle 1 is activated, for example to raise the movable part 3, hydraulic fluid in the supply line 6 is pressurised. As a result, the pressure switch 10 closes and the circuit shown in FIG.

3 is complete. Accordingly, current is supplied to the alarm generator 11 which generates an audible alarm. The audible alarm is generated as long as a hydraulic fluid in the supply line 6 has a pressure exceeding 4000 Pa.

In normal use, once tipping or any other operation has ceased, the hydraulic system 7 is switched off so that the hydraulic fluid is no longer under pressure and the hydraulic piston 5 retracts and the movable part 3 is lowered into its rest position. The audible alarm is capable of providing an audible signal if depressurisation does not occur in this way for any reason. This will provide an alarm to the driver of the vehicle 1 that the movable part 3 is still in its raised position and that there is a hazard if the vehicle is driven away.

The alarm will also serve to warn any person maintaining the hydraulic system 7 that there is pressurised hydraulic fluid in the system. The alarm will also serve to warn a person maintaining the movable part 3 that it is maintained in a raised position by pressurised fluid and that if the supply pressurised fluid is removed, the movable part 3 will move.

The present invention has been described above purely by way of example and modification can be made within the spirit of the invention, which extends to equivalents of the features described. The invention also consist in any individual features described or implicit herein or shown or implicit in the drawings or any combination of any such features or generalisation of any such features or combination.

What is claimed is:

1. An alarm for a hydraulic system said hydraulic system comprising: hydraulic fluid, said alarm comprising a connector for connecting to said hydraulic system, a pressure detector, said connector being for putting said pressure detector in contact with said hydraulic fluid, said pressure detector being for giving a signal in response to a condition of said hydraulic fluid in said hydraulic system, and an alarm generator integral with said pressure detector for giving an audible alarm in response to said signal.

2. An alarm according to claim 1, wherein said pressure detector is a pressure switch.

3. An alarm according to claim 1, wherein said pressure detector and said alarm generator are mounted in a common structure which comprises said connector for connecting to said hydraulic system and a part for transmitting said audible alarm from said alarm generator.

4. A hydraulic system comprising an alarm, said hydraulic system comprising hydraulic fluid, a pressure detector which is for giving a signal dependent upon the condition of said hydraulic fluid, and an alarm generator integral with said pressure detector for giving an audible alarm in response to said signal.

5. A hydraulic system according to claim 4, wherein said pressure detector is a pressure switch.

6. A hydraulic system according to claim 4, wherein said pressure detector and said alarm generator are mounted in a common structure which comprises a part for transmitting said audible alarm from said alarm generator.

7. A vehicle comprising a movable part and a hydraulic system for operating said movable part, said hydraulic system comprising hydraulic fluid, a pressure detector for giving a signal in response to a condition of said hydraulic fluid, and an alarm generator for giving an audible alarm in response to said signal, said alarm generator being integral with said pressure detector.

8. A vehicle according to claim 7, wherein said pressure detector is a pressure switch.

9. A vehicle according to claim 7, wherein said pressure detector and said alarm generator are mounted in a common structure which comprises a part for transmitting said audible alarm from said alarm generator.

10. A vehicle according to claim 7, wherein said alarm generator is for giving a signal which is audible within a cab of said vehicle.

11. A method of giving an alarm in a hydraulic system, said hydraulic system comprising hydraulic fluid, said method comprising putting said hydraulic fluid in contact with a pressure detector, giving a signal dependent upon the condition of said hydraulic fluid, giving said signal to an alarm generator integral with said pressure detector, for giving an audible alarm in response to said signal.

* * * * *